Patented Apr. 19, 1927.

1,625,203

UNITED STATES PATENT OFFICE.

HERBERT L. GLAZE, OF SOUTH PASADENA, CALIFORNIA, ASSIGNOR OF ONE-HALF TO A. R. MAAS CHEMICAL CO., OF LOS ANGELES, CALIFORNIA, A CORPORATION OF CALIFORNIA.

ART OF DISPERSING MATTER INTO FINELY-DIVIDED FORM.

No Drawing.     Application filed September 30, 1924. Serial No. 740,882.

My invention has to do with a new and useful art or process of reducing matter to its finest parts by the use of heat, mixture and dissolution, whereby I am able to secure a much finer resultant than is possible by any mechanical grinding and pulverizing action.

The general procedure heretofore has been to break up the matter mechanically by means of grinding machines, or chemically by means of precipitation, as for example, sulfur is precipitated from a poly-sulfide solution by means of acid, or carbon black is deposited upon a cool metal plate by a gas flame.

In order to explain my invention, I will use sulfur as the matter to be treated, and will use soda ash as the base, and with these two substances I can explain the principle of my invention, it being understood, of course, that I do not limit my invention to sulfur as the fusible matter, or to soda ash as the base, these substances being used as illustrations for explanatory purposes.

In producing finely divided sulfur, 1 proceed as follows: One part of sulfur and three parts of finely ground light soda ash, by weight, are placed in a suitable vessel and heated to a temperature of approximately 120 degrees centigrade and thoroughly stirred. The sulfur melts and covers the surfaces of particles of soda ash in the form of a film which may be only one or more molecules in thickness. The mixture is then placed in water which dissolves the soda ash, leaving the films of sulfur suspended in the solution. The sulfur is filtered out and washed first with acid and then clear water to remove the last traces of the soda ash. The sulfur films are so exceedingly thin that they break up spontaneously into small particles of such a size as to show Brownian movements when suspended in water and viewed under a high power microscope.

Finely divided carbon can be made in the same way, except that I use a highly carbonaceous matter, such as a high melting asphaltum, and heat the mixture, leaving a film of practically pure carbon upon the particles of soda ash. The soda ash is then dissolved out with water and the carbon is filtered and washed the same as in the case of the sulfur.

Only sufficient of the fusible material should be used to cover the surfaces of the particles of soda ash, or other base which may be used. Any substance or matter can be used as a base or dispersing medium which will dissolve in a suitable solvent and which is finely divided, and any substance or matter can be dispersed under my process which will melt at a temperature below that required to melt the base or dispersing medium and which is not soluble in the solvent selected. The base or dispersing medium and the dispersed substance must have no chemical action upon each other at the temperature used and the solvent must have no chemical action upon the dispersed substance, but the solvent may have a chemical action upon the base or dispersing material, provided no insoluble precipitate be produced which would tend to contaminate the dispersed substance.

The formation of a film of dispersed matter upon a base or dispersing substance is in accordance with the recognized laws of adsorption of liquids upon solids and a film will be very thin in the order of a few molecules. In fact the films of carbon, produced as above described, or rather the fragments thereof, seem to be transparent under a high powered microscope. These thin films offer little resistance to the passage of the solvent to dissolve the base or dipersing material.

Thus I have invented a new art of producing a more finely divided condition of matter than is possible under any mechanical process and while I have described certain substances and their use in carrying out my new art, I do not limit my invention to these particular substances, except as I may be limited by the hereto appended claims.

I claim:

1. The art of reducing fusible matter to a finely dispersed condition which consists in mixing said matter with a base matter finely powdered and fusible at a higher temperature than the first mentioned matter and capable of being wetted by the first mentioned matter in the liquid phase, heating the mixture to a temperature to fuse the first mentioned matter but below either the melting point or decomposing point of the base matter and stirring together until all the particles of the base matter are coated with films of the fused matter, and then dissolving and removing the base matter therefrom.

2. The art of reducing matter to a finely dispersed condition which consists in mixing the matter to be dispersed in a fused condition with a second matter finely powdered and fusible at a higher temperature than the said first mentioned matter and not subject to decomposition at the temperature used, whereby said second matter is coated with said fused matter, said matters being such that they have mutual adsorptive action but no chemical action on each other at the temperature used, and then dissolving out the second matter with a suitable solvent, whereby to leave the mere shells of the first matter.

3. The art of producing divided or dispersed substances which includes the fusing of a suitable substance to be dispersed, adsorbing the same in a thin film upon the surfaces of the particles of a finely divided base matter, chemically inert to said substance, and dissolving said base matter out by means of a suitable solvent.

4. The art of producing finely dispersed matter which includes the heating together to a temperature above its fusion point of a fusible matter, and, at the temperature used an infusible granular matter chemically inert to the fusible matter, coating said infusible granular matter with said fusible matter, dissolving said infusible granular matter in a suitable solvent and recovering the fusible matter in a finely divided state upon a filter, washing and purifying said finely divided fusible matter upon said filter.

5. The art of reducing matter to a fine form which includes mixing said matter in a fused form with a matter in comminuted unfused form, coating the particles of said matter in comminuted form with a thin film of said fused matter, and in dissolving said matter in comminuted form out from said film.

Signed at Los Angeles, Los Angeles County, California, this 25th day of September, 1924.

HERBERT L. GLAZE.